Patented Nov. 5, 1929

1,734,369

UNITED STATES PATENT OFFICE

CHARLES FISCHER, JR., OF WYOMING, AND WARREN T. REDDISH, OF CINCINNATI, OHIO, ASSIGNORS TO THE TWITCHELL PROCESS COMPANY, OF CINCINNATI, OHIO, A CORPORATION OF OHIO

SULPHONIC BODY

No Drawing.   Application filed September 2, 1926.   Serial No. 133,300.

Our invention relates to a certain class of metallic derivatives of products formed by treating mineral oil with sulphuric acid, and our invention also relates to the art and process of forming the same.

The mineral oils embraced within the scope of this invention are the hydro-carbon oils characterized by the presence of certain components susceptible to modification by the action of sulphuric acid and certain components not susceptible. Oils such as petroleum, shale oil, coal tar oil, gilsonitic distillates and many other fractions or distillates of hydro-carbon deposits usually exemplify this characteristic.

Since petroleum is commercially available at present in such large quantities, the following disclosure is made in relation thereto.

The chemistry of the mineral oils, including petroleum, is very complex and the exact molecular structures of the components thereof have never been definitely ascertained or proved.

When petroleum or fractions thereof, such as lubricating stock, are treated with sulphuric acid, certain components of the oil are modified. The theory chemically accepted at present explains this modification as sulfonation, i. e., the sulphuric acid reacts with the mineral oil to form mineral oil sulphuric acid. These sulphonic bodies are characterized by their high molecular weights compared to benzine sulphonic acid. The yield of sulphonic acid is higher when the oil is treated with fuming sulphuric acid, so this disclosure is in relation to this fuming sulphuric acid treatment, though the so-called common sulphonic bodies produced by the conventional acid refining can be used.

It is further theory that these mineral oil-sulphonic acids can be reacted with metallic substances or compounds such as alkali hydroxides or sodium carbonate, for instance, to produce salts of mineral oil-sulphonic acids. Research to date seems to indicate that these assumptions are correct, but in the ensuing description of the invention and the claims, it is to be understood that the procedure and characteristic products thereof, as described, is the real substance of the invention and that the chemical terms are used for convenience and the corresponding or implied chemical explanation is merely offered for the benefit of the skilled in the art.

The object of our invention is to provide an alkaline, homogeneously water soluble, sulphonic reagent comprising a salt of mineral oil sulphonic acid and an inorganic salt.

Another object of our invention is to provide a preferred proces of producing this reagent.

When a mineral oil such as lubricating stock, for instance, is treated with sulphuric acid, two layers form. The upper or oil layer is known in the art as the A layer, and the lower or sludge layer is known as the B layer.

Some of the pertinent sulphonic sludge acids and salts, and the processes of making them are described in the patents to Robert E. Divine, namely: 1,301,662, April 22, 1919; 1,301,663, April 22, 1919; 1,303,779, May 13, 1919; 1,319,027, Oct. 14, 1919; 1,330,624, Feb. 2, 1920; 1,438,101, Dec. 5, 1922.

Our reagent comprises an intimate mixture of B layer mineral oil sodium sulphonate and sodium aluminate. This reagent is decidedly alkaline as well as water soluble, and is admirably adapted for all uses where there is desired a sulphonic reagent possessed of these properties, for instance, in decomposing certain petroleum and saline water emulsions.

The preferred process of producing this reagent is to treat B layer aluminum sulphonate with aqueous sodium hydroxide to a phenol phthalein end point. The resulting product contains sodium sulphonate plus sodium aluminate. For instance, 50 pounds of sludge layer mineral oil aluminum sulphonate is mixed with 11.1 pounds of a 30% aqueous solution of commercial sodium hydroxide. The temperature of this reaction is preferably about 119° F. The substances are agitated or stirred until thoroughly mixed.

This process is economical; it involves no handling of the sulphonic bodies in the acid phase; and it provides a uniform mixture of salts.

Having described our invention, we desire to be limited only to the following ensuing claims:

1. An alkaline, water soluble sulphonic body, the constituting components of which are sludge layer mineral oil aluminum sulphonate and sodium hydroxide.

2. The process of producing an alkaline, water soluble sulphonic body by treating sludge layer mineral oil aluminum sulphonate with sodium hydroxide to a phenol phthalein end point.

In witness whereof, we hereunto subscribe our names.

CHARLES FISCHER, Jr.
W. T. REDDISH.